United States Patent
Eavenson, Sr. et al.

(10) Patent No.: US 7,451,865 B2
(45) Date of Patent: Nov. 18, 2008

(54) PARK BRAKE AND CONTROL LEVER INTERLOCK FOR ZTR VEHICLE

(75) Inventors: Jimmy N. Eavenson, Sr., Aurora, OH (US); Peter Buchanan, Hudson, OH (US)

(73) Assignee: Commercial Turf Products, Ltd., Streetsboro, OH (US)

( * ) Notice: Subject to any disclaimer, the term of this patent is extended or adjusted under 35 U.S.C. 154(b) by 340 days.

(21) Appl. No.: 11/328,920

(22) Filed: Jan. 10, 2006

(65) Prior Publication Data

US 2006/0172857 A1    Aug. 3, 2006

Related U.S. Application Data

(60) Provisional application No. 60/644,624, filed on Jan. 18, 2005.

(51) Int. Cl.
*B60W 10/10* (2006.01)
*B60W 10/18* (2006.01)
*A01D 69/10* (2006.01)

(52) U.S. Cl. ........................................ 192/219; 56/11.3
(58) Field of Classification Search ................ 192/219; 56/11.3, 16.7; 180/305, 307
See application file for complete search history.

(56) References Cited

U.S. PATENT DOCUMENTS

| | | | |
|---|---|---|---|
| 5,496,226 A | 3/1996 | Splittstoesser et al. | |
| 5,984,031 A | 11/1999 | Velke et al. | |
| 6,056,074 A | 5/2000 | Heal et al. | |
| 6,092,617 A | 7/2000 | White, III et al. | |
| 6,301,864 B1 | 10/2001 | Damie et al. | |
| 6,434,917 B1 | 8/2002 | Bartel | |
| 6,550,563 B2 | 4/2003 | Velke et al. | |
| 6,729,115 B2 | 5/2004 | Bartel | |
| 6,739,116 B2 * | 5/2004 | Stover et al. | ................. 56/11.3 |
| 6,912,831 B2 | 7/2005 | Velke et al. | |

* cited by examiner

*Primary Examiner*—Tisha D Lewis
(74) *Attorney, Agent, or Firm*—Wegman, Hessler & Vanderburg

(57) ABSTRACT

A ZTR lawnmower having first and second drive wheels and first and second control levers to control the direction and speed of rotation of the first and second drive wheels. The lawnmower further includes a park brake system operatively interconnected with at least one of the drive wheels, and an interlock mechanism interfacing with the parking system. The park brake interlock mechanism includes a parking brake handle movable between an engaged position and a disengaged position to cause the park brake system to respectively resist and not resist rotation of the at least one drive wheel. The interlock mechanism interfaces with the park brake handle and the control levers such that when the first and second control levers are in the neutral position, the interlock mechanism permits the parking brake handle to be placed in the engaged position, and when the first and/or second control levers are not in the neutral position, the interlock mechanism prevents the parking brake handle from being placed in the engaged position.

11 Claims, 5 Drawing Sheets

PARK BRAKE AND CONTROL LEVER INTERLOCK FOR ZTR VEHICLE

CROSS-REFERENCE TO RELATED APPLICATION

This application claims the priority benefit of U.S. Provisional Patent Application No. 60/644,624 filed Jan. 18, 2005.

BACKGROUND OF THE INVENTION

1. Field of Invention

This invention relates to the field of lawnmowers and, more specifically, to zero turn lawnmowers and a mechanical control lever and parking brake interlock for such mowers.

2. Description of Related Art

It is known in the art to provide vehicles such as lawnmowers with drive systems that provide for Zero Turn Radius (ZTR) steering. ZTR vehicles typically have two drive wheels that can be rotated at different speeds to achieve turning. The drive wheels can also be rotated in different directions for a very sharp turn or even a zero turn radius which is when the mower actually turns about the mid point of the drive wheel axis. The other wheels on the mower are castered and merely follow the drive wheels.

ZTR vehicles are typically controlled by a pair of side-by-side speed control levers that are independently operated for use in steering and propelling the vehicle. The speed control levers move forward and aft from a neutral position to achieve variable speed and steering. These two essentially vertically positioned levers can be positioned close together between the operator's knees or positioned out to the sides of the operator with horizontal gripping portions extending in toward the center of the mower for easy side-by-side gripping. Each of the dual speed control levers are connected to a respective drive device, such as a hydrostatic drive, that are, in turn, connected to the drive wheels for use in propelling and steering the vehicle. The hydrostatic drive typically includes a variable displacement axial piston hydraulic pump for each of the two fixed axle drive wheels. Each speed control lever independently controls the speed of one of the drive wheels which permits a variety of maneuvers including rotating one wheel forward while rotating the other backward, which causes the mower to turn within its own dimensions. With ZTR steering, the vehicle becomes much more maneuverable than conventional vehicle steering.

ZTR vehicles typically require means to prevent starting the machine unless the control levers are in their neutral positions. This is typically accomplished by sensing the position of the speed control levers and disabling the starting control power circuit unless the speed control levers are in their neutral position. Thus, the operator is typically required to place the speed control levers into slotted sections corresponding to the neutral position of the levers to activate the neutral position switches. Other systems have intricate mechanical systems that force the speed control levers into the neutral position when the parking brake is set. Such prior arrangements are complicated and expensive to manufacture and yet not totally reliable.

SUMMARY OF THE INVENTION

The present invention provides an improved mechanical interlock that is cost effective and efficient in design.

In one embodiment, the invention is a riding lawnmower. The lawnmower has a chassis, a power source, and first and second drive wheels at least partially supporting the chassis and rotatable via the power source to cause movement of the lawnmower. The lawnmower further has first and second control levers associated with and controlling first and second drive systems, respectively, to control the direction and speed of rotation of the first and second drive wheels, respectively, each of the control levers having a neutral position in which the associated drive system does not cause rotation of the associated drive wheel. The lawnmower further includes a park brake system operatively interconnected with at least one of the drive wheels, and an interlock mechanism interfacing with the parking system, the park brake interlock mechanism comprising a parking brake handle movable between an engaged position and a disengaged position to cause the park brake system to respectively resist and not resist rotation of the at least one drive wheel, the interlock mechanism interfacing the park brake handle and with the control levers such that when the first and second control levers are in the neutral position, the interlock mechanism permits the parking brake handle to be placed in the engaged position, and when the first and/or second control levers are not in the neutral position, the interlock mechanism prevents the parking brake handle from being placed in the engaged position.

In one embodiment, each control levers of the lawnmower comprises a plate member having a notch therein, the notch being located such that when the control lever is in the neutral position, a portion of the interlock mechanism is received within the notch when the park brake handle is placed in the engaged position, and when the control lever is not in the neutral position, the interlock mechanism contacts the plate member and prevents the park brake handle from being placed in the engaged position.

In another embodiment, the invention is a riding lawnmower. The lawnmower includes a chassis, an engine mounted to the chassis, and a rotary cutting blade selectively rotated by the engine. The lawnmower further includes first and second drive wheels at least partially supporting the chassis and rotatable to cause movement of the chassis and first and second control levers associated with and controlling first and second drive systems, respectively, to control the direction and speed of rotation of the first and second drive wheels, respectively, each of the control levers having a neutral position in which the associated drive system does not cause rotation of the associated drive wheel. The lawnmower further includes a parking brake operatively interconnected with the one of the wheels and a parking brake handle interconnected with the chassis and movable between an engaged position and a disengaged position to cause the parking brake to respectively resist and not resist rotation of the one wheel. The lawnmower further includes a brake sensor determining when the parking brake handle is in the engaged position, the brake sensor preventing an associated starting device from starting the engine when the parking brake handle is not in the engaged position, the starting device not using sensors separate from the brake sensor to determine whether the control levers are in the neutral positions.

These and other features and advantages of this invention are described in, or are apparent from, the following detailed description of various exemplary embodiments of the systems and methods according to this invention.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
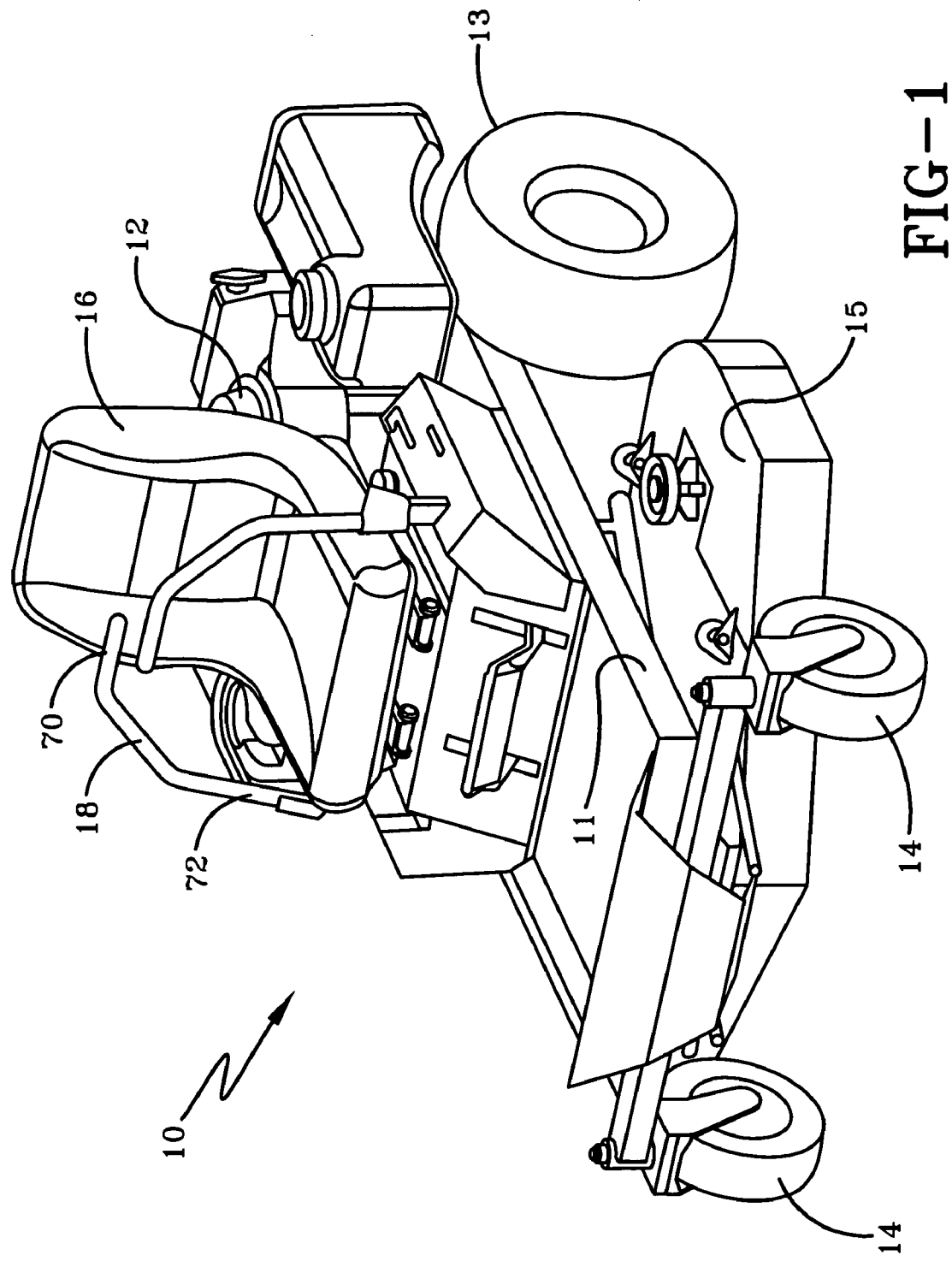
FIG. 1 is front view of a lawnmower including a park brake interlock mechanism embodying the invention.

Referring now to FIG. 1, a riding lawnmower 10 of the type able to turn with a turn radius that is substantially zero (referred to herein as a "ZTR" mower) is illustrated. The ZTR mower 10 is built on a chassis 11 which supports a power source such as an engine 12, a pair of drive wheels 13, a pair of caster mounted follower wheels 14, and a conventional multi-blade deck 15. In use, the drive wheels 13 are used to move the riding mower 10 and the castor wheels 14 support the front end of the riding mower 10. The riding mower 10 also includes a seat 16 for an operator and a pair of direction and speed control levers 18 that are used to control the direction and the speed of revolution of the drive wheels 13 to thereby control the speed and direction of the mower 10. The control levers 18 are rotatably attached to the chassis 11 and move forward and aft from a neutral position to achieve variable speed and steering of the mower 10.

In one embodiment, the drive wheels 13 are individually powered by hydrostatic pumps (not shown) through the movement of the speed control levers 18. As is known, variable flow hydrostatic pumps are controlled by swash plate positioning shafts (not shown) which positions a swash plate (not shown) within the pump. When the swash plate is positioned normal to the piston of the pump with the pump running, the flow rate of the pump is zero flow, also called neutral, and as the swash plate is tilted forward, the flow begins to increase up to a maximum level, and if the swash plate is tilted backward, the flow is reversed, thereby providing an infinite number of speeds for the vehicle being driven either forward or backward. It will be understood that although preferred hydrostatic drive systems will include separate pumps for each of the drive motors, a single pump and appropriate valves could be substituted to allow each of the drive wheels or other ground engaging means to be independently driven from the single pump. Except as set forth below, the above described mower components are considered known in the art and therefore not described in further detail. The drive wheels 13 have associated therewith a parking brake system 22 (FIGS. 2-6) that locks the drive wheels 13 when the parking brake system is engaged. The mower 10 may alternatively have a parking brake system 22 that operates on only one of the wheels 13. As is known in the art, the mower 10 includes a starting safety circuit (not shown) that requires the parking brake system 22 to be in the engaged position in order to start the engine 12.

Figure 2:
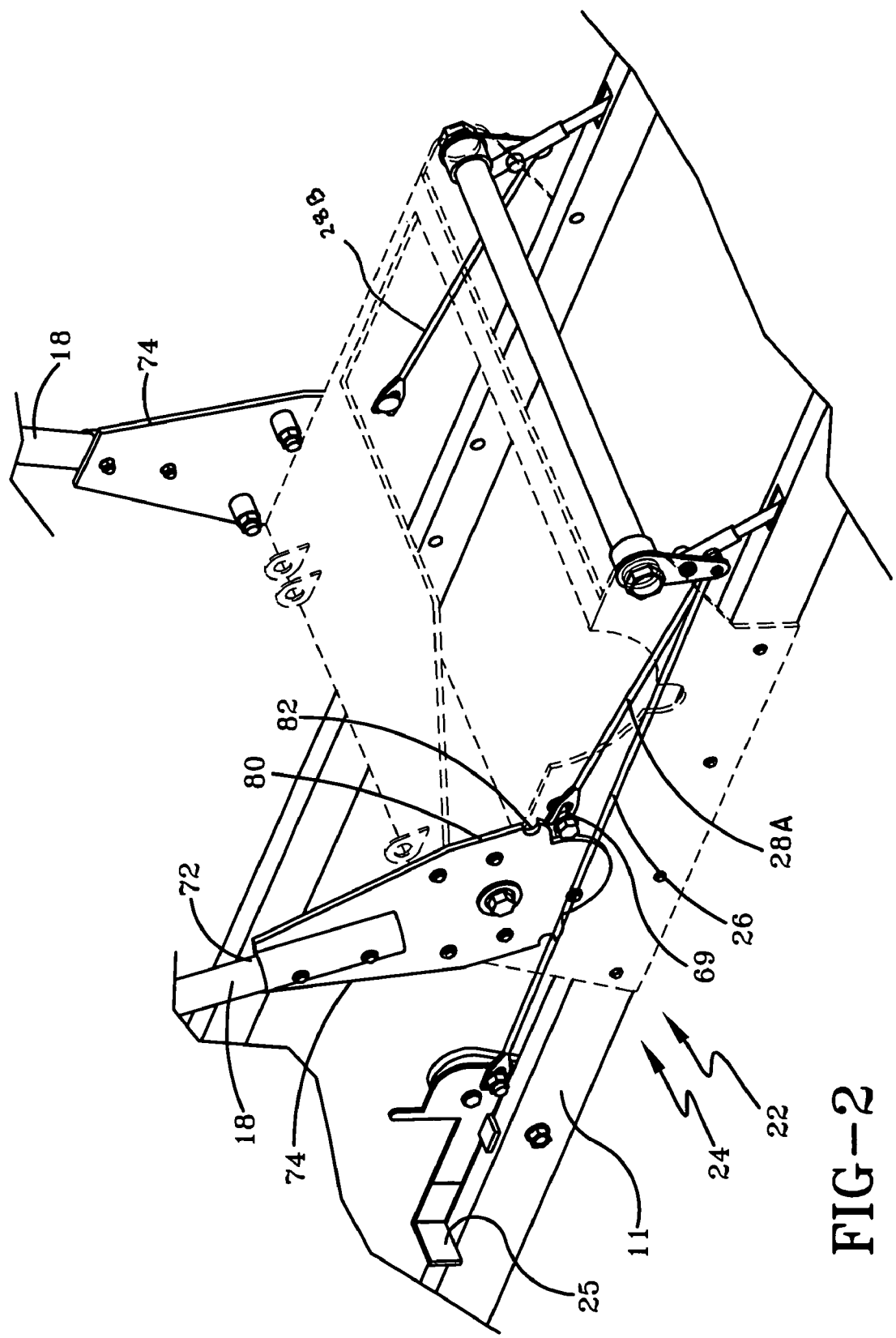
FIG. 2 is a cutaway front right perspective view of the interlock mechanism with the parking brake disengaged.
Figure 3:
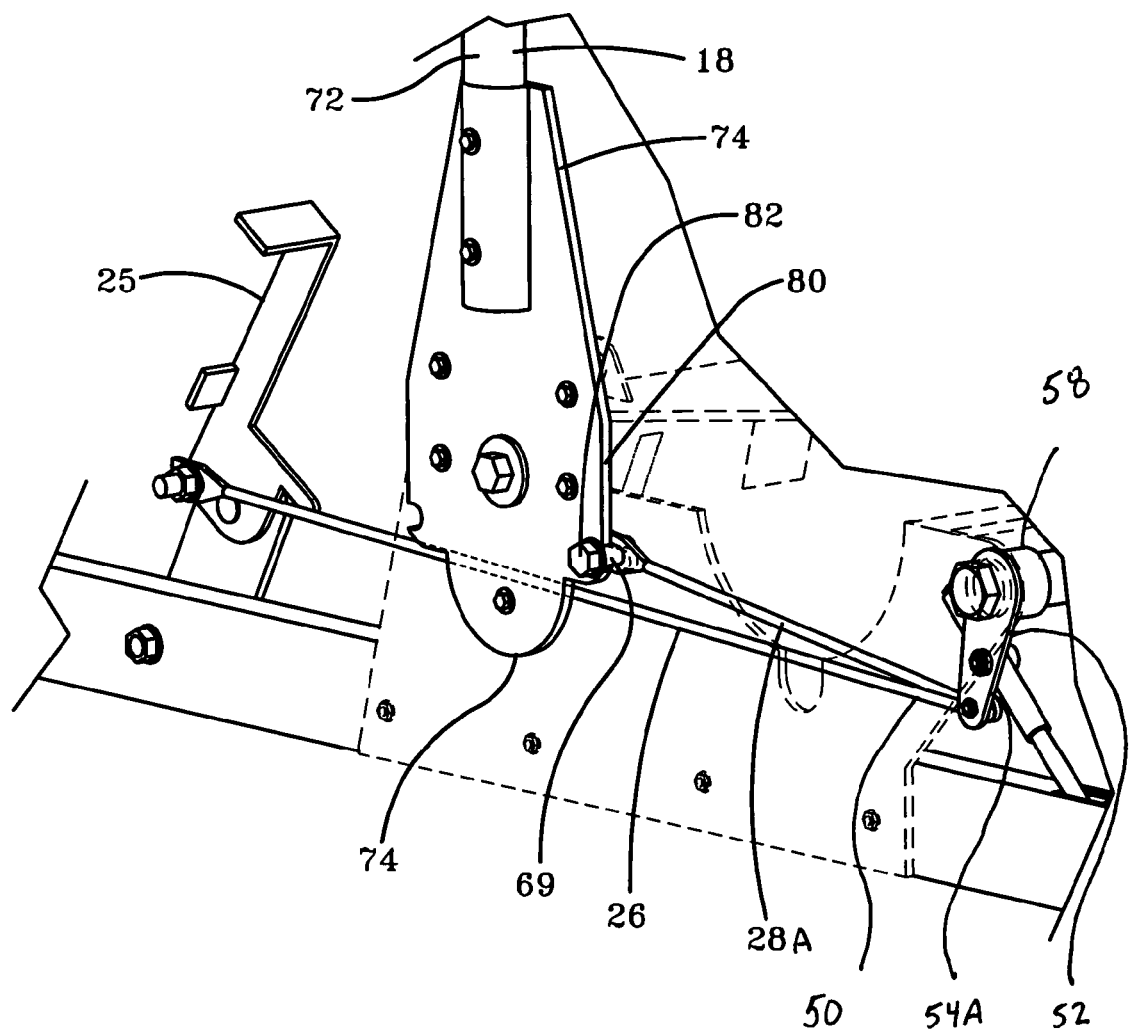
FIG. 3 is an enlarged cutaway front right perspective view of the interlock mechanism with the parking brake engaged.

FIGS. 2 and 3 show the mower 10 with substantial portions removed so that a parking brake interlock mechanism, indicated generally at 24, that interfaces with the parking brake system 22 can be seen. The parking brake interlock mechanism 24 is mounted to the chassis 11 and includes a parking brake actuating handle 25, a brake actuating rod 26 and a pair of interlock arms 28A and 28B. As best seen in the exploded view of FIG. 4, the parking brake handle 25 is mounted on a handle plate 30 with a suitable bolt 32, nut 33 and washers 34 such that the mower operator can pivot the parking brake handle 25 about pivot axis A to selectively engage the parking brake system 22. Bolt 35 and nut 36 securely affix the handle plate 30 to the chassis 11. The brake actuating rod 26 is mounted to one end 38 of the park brake handle 25 on a boss 40 extending therefrom with nut 42. As illustrated, the parking brake handle 25 is movable between a disengaged position (as seen in FIG. 2) and an engaged position (as seen in FIG. 3), thereby moving end 38 of the handle 25 to selectively move the brake actuating rod 26.

Figure 5:
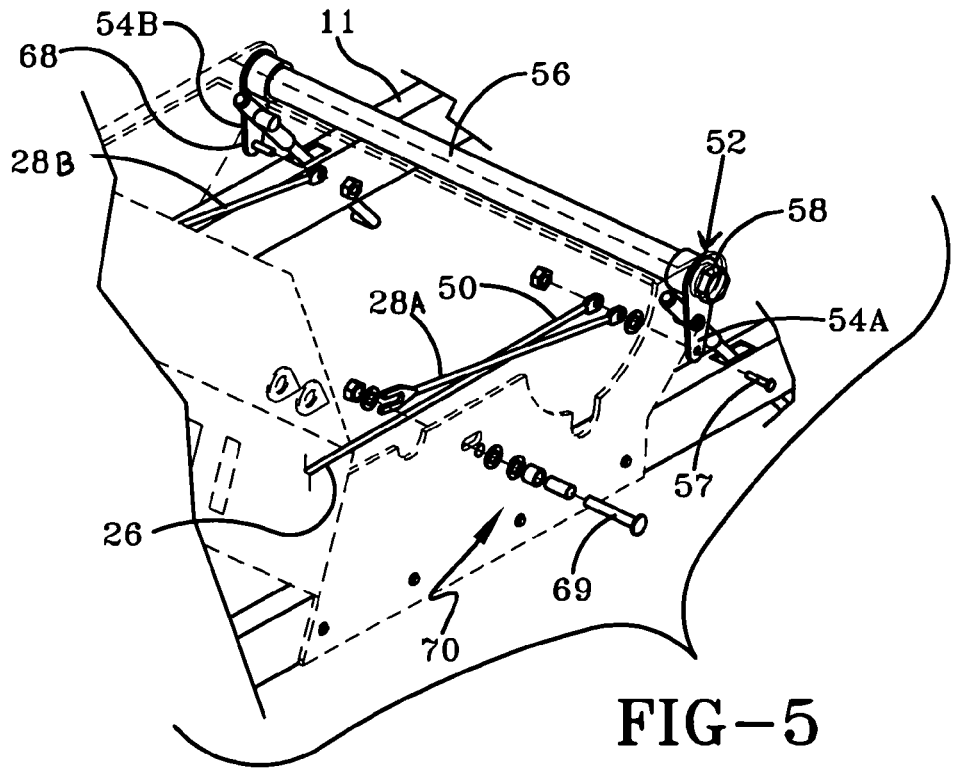
FIG. 5 is a cutaway exploded perspective view of a portion of the interlock mechanism containing the interlock arms.
Figure 6:
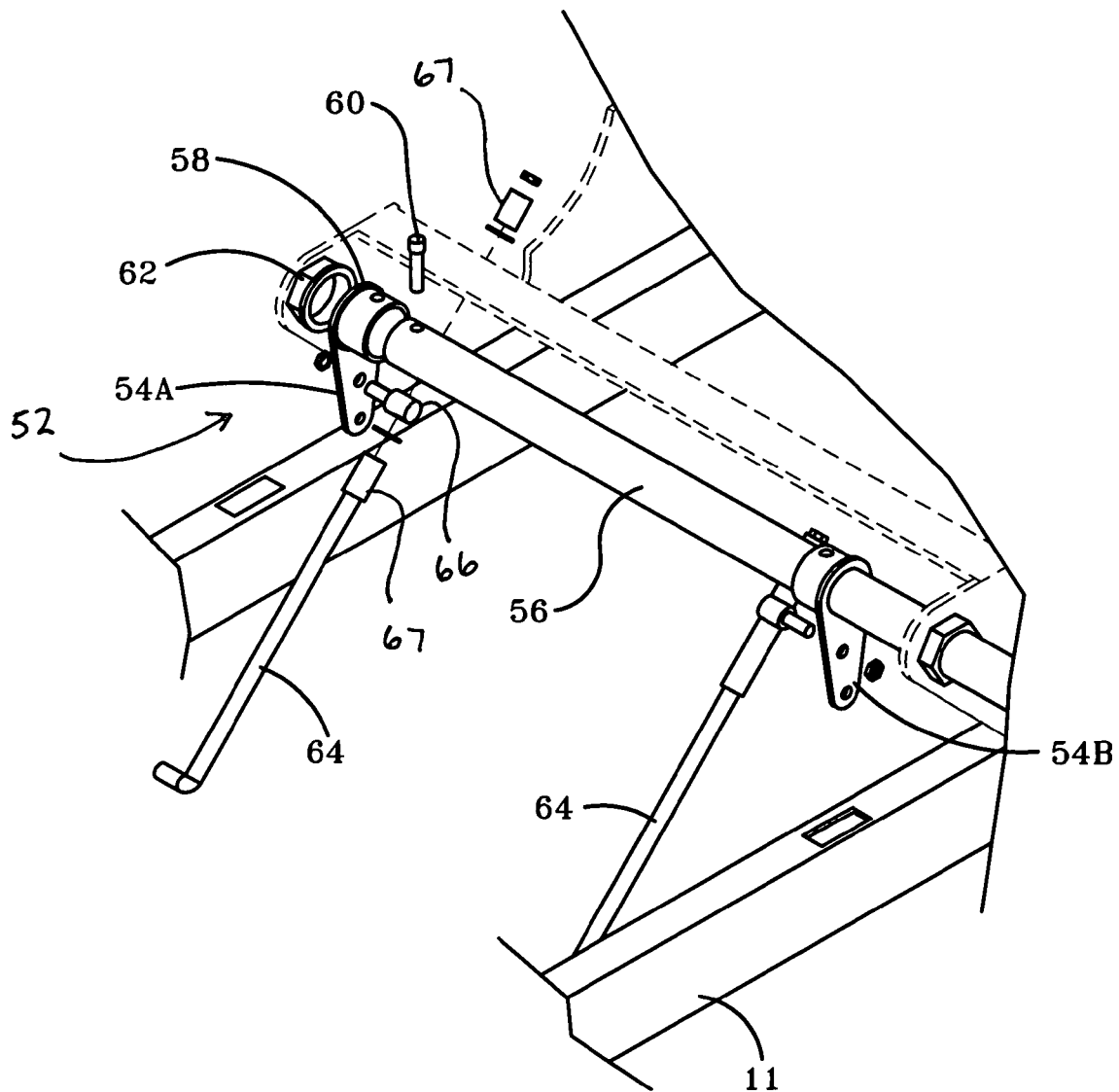
FIG. 6 is a cutaway exploded perspective view of a portion of the interlock mechanism containing a bell-crank linkage.

Referring now to FIGS. 5 and 6, a second end 50 of the brake actuating rod 26 is affixed to a bell-crank linkage 52. The bell-crank linkage 52 includes two offset links 54A and 54B with an extension arm 56 that extends transverse across the mower chassis 11 connecting the two links. The brake actuating rod 26 is affixed to a lower end of offset link 54A with bolt 57. In the illustrated embodiment, the extension arm 56 is keyed to a hub 58 on the offset links 54A and 54B and a dowel pin 60 passes through the hub and arm to secure the arm to the offset links. Therefore, the two offset links 54A and 54B are effectively tied together by the extension arm 56. The bell-crank linkage 52 is mounted on the chassis 11 with bearings 62 such that actuation of the park brake handle 25 causes a rotating movement of the both the offset links 54A and 54B through movement of the brake actuating rod 26.

As can be seen in FIGS. 2 and 3, actuation of the park brake handle 25 causes a generally linear rearward movement of the brake actuating rod 26. This movement of the brake actuating rod 26 pulls on the offset link 54A thereby causing rotation of both offset links 54A and 54B. Rotation of the offset links 54A and 54B actuates the parking brakes system 22 through brake levers 64 mounted to the offset links using suitable joints 66 and compression springs 67. The portion of the brake system 22 mounted on the drive wheels 13 can include a conventional disk brake system (not shown) or other brake system and would be understood by one skilled in the art. Therefore, further discussion of the brake system 22 is not described herein. Accordingly, when the brake handle 25 is in the raised position, the parking brake system 22 is engaged and substantially prevents the drive wheels 13 from rotating. Conversely, when the brake handle 25 is in the lowered position, the parking brake system 22 is disengaged and does not resist rotation of the wheels 13.

The brake actuating rod 26 is also operatively linked to the interlock arms 28A, 28B so that actuation of the park brake handle 25 also causes movement of the interlock arms 28A, 28B. In the illustrated embodiment, the interlock arms 28A, 28B are interconnected with the brake actuating rod 26 at the lower end of the offset links 54A and 54B. As best seen in FIG. 5, the same bolt 57 that attaches the brake actuating rod 26 to the offset link 54A also passes through a hole in one end of the interlock arm 28A to link the brake actuating rod 26 to the interlock arm 28A. A bolt 68 similarly attaches the second interlock arm 28B to offset link 54B. Of course, other means for connecting the brake actuating rod 26 and the interlock arms 28A, 28B may be used using sound engineering judgment. Accordingly, the interlock arms 28A, 28B are linked to the brake actuating rod 26 such that movement of the park brake handle 25 results in movement of the interlock arms 28A, 28B. A post 69 is provided on each of the interlock arms 28A, 28B. In one embodiment, the interlock arm 28A has a nut and bolt assembly 70 that extends through the interlock arm and provides the post 69 on the outboard side of each interlock arm. However, other means for providing a post 69 on either the outboard or inboard side of the interlock arm 28A may be used using sound engineering judgment. The post 69 on interlock arm 28B desirably is substantially similar to the post on the interlock arm 28A and need not be described separately.

Referring now to FIGS. 1-3, each of the control levers 18 comprises a generally horizontal handlebar portion 71 at one end thereof and a generally vertical control lever shaft 72. A control plate 74 is attached to the end of the control lever shaft 72. The control plate 74 interconnects the associated control lever 18 with a conventional hydrostatic pump (not shown) that drives one of the drive wheels 13. For example, the control levers 18 and thus the control plates 74 are illustrated in a neutral position in FIG. 3. The right control lever 18 may be used to rotate the associated control plate 74 in the forward or the reverse direction to cause forward and reverse rotation, respectively, of the associated right drive wheel 13. The further the control lever 18 rotates the control plate 74 in the respective directions, the greater the resulting speed of rotation of the associated drive wheel 13. Desirably, return springs (not shown) provide biasing forces on the control levers 18 to bias the control levers toward the neutral position.

As best seen in FIGS. 2, an edge 80 of the control plate 74 has a notch 82 formed therein. In the illustrated embodiment, the notch 82 is in a forward edge 80 of the control plate 74, or the edge closest to the post 69 on the interlock arm 28. The notch 82 is located in the control plate 74 so that when the control arm 18 and the control plate 74 are in the neutral position, the notch aligns with the post 69 on the associated interlock arm 28 (referring generically to either interlock arm 28A or 28B). When the parking brake handle 25 is rotated to the engaged position, thereby causing the interlock arm 28 to move in a rearward direction, the post 69 is received in the aligned notch 82 as shown in FIG. 3. If the parking brake handle 25 were to be rotated toward the engaged position while the control lever 18 and control plate 74 were not in the neutral position, the notch 82 would not align with the post 69 on the interlock arm 28 an the post 69 would contact the edge 80 of the control plate 74, thereby preventing the parking brake handle 25 from being positioned in the engaged position. Although not illustrated, both of the control plates 74 have similar notches 69. As the control levers 18 are able to move independent from the each other, if the control levers are positioned such that one of the control levers is in its neutral position while the other control lever is in a position other than its neutral position, the post 69 on the interlock arm 28 on the side where the control lever 18 is positioned out of neutral would contact the control plate 74 on that side and prevent the brake handle 25 from being positioned in the engaged position. Accordingly, the parking brake system 22 can only be engaged when both of the control levers 18 are in their neutral positions. Whenever either of the control levers 18 is not in the neutral position, the notch 82 on the control plate 74 does not align with the post 69 on the respective interlock arm 28 and prevents rotation of the park brake handle 25 into the engaged position. As used herein, notch 82 is broadly defined as a cutout portion or shape having any size or dimension capable of receiving the post 69.

Figure 4:
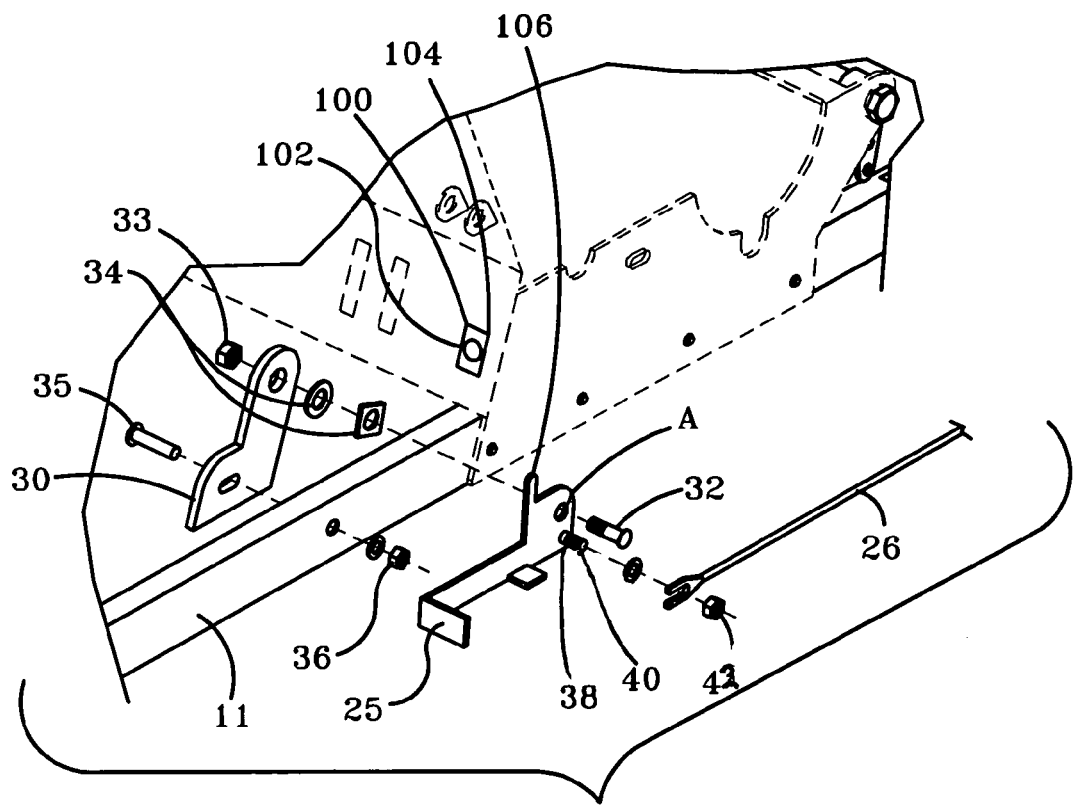
FIG. 4 is a cutaway exploded perspective view of a portion of the interlock mechanism including the park brake handle.

FIG. 4 illustrates a park brake sensor or interlock switch 100 that is interconnected with the starting circuitry (not shown) of the engine 12 (FIG. 1). In one embodiment, the interlock switch 100 includes a plunger 102 that is biased to extend out of a housing 104. When the parking brake handle 25 is in the engaged position, a condition that can only be obtained with both control levers 18 are in their neutral positions, a finger 106 on the park brake handle 25 abuts the plunger 102 and pushes the plunger into the housing 104. The depressed plunger 102 closes the starting circuitry and permits electrical startup of the engine 12. When the parking brake handle 25 is in the disengaged position, the finger 106 is moved away from the interlock switch 100, permitting the plunger 102 to move out of the housing 104 and open the circuitry, thereby preventing startup of the engine. Other sensors or switches known to those skilled in the art, such as magnetic proximity switches and the like, may also be used for the interlock switch 100 without departing from the scope of the invention.

In this regard, the interlock switch 100 acts as a sensor that determines both whether the parking brake handle 25 is in the engaged position, indicating that the park brake system 22 is engaged, and whether the control levers 18 are in the neutral position, since the park brake handle 25 cannot be positioned in the engaged position unless both control levers are in the neutral position. Although the interlock switch 100 is described herein as being actuated by a finger 106 on the park brake handle 25, one skilled in the art will understand that the interlock switch may be triggered in other ways when the park brake handle is in the required position using sound engineering judgment. For example, the interlock switch may be triggered by a finger (not shown) on one of the interlock arms 28 or on the brake actuating rod 26 without departing from the scope of the invention.

In operation, the parking brake handle 25 must be set so that the finger 106 engages the interlock switch 100 to enable the mower start circuit. With the start circuit activated, the engine 12 can be started. After startup, the engine 12 remains operative independent of the start circuit. Therefore, the interlock switch 100 is configured to determine when the parking brake handle 25 is in the engaged position. The starting circuit prevents the engine 12 from starting when the parking brake handle 25 is not in the engaged position. Accordingly, the starting device does not use sensors directly determining whether the control levers are in the neutral positions. The park brake interlock mechanism 24 interfaces with the parking brake handle 25 and with the control levers 18 such that when both of the control levers are in the neutral position, the interlock mechanism permits the parking brake handle 25 to be placed in the engaged position, and when either of the control levers are not in the neutral position, the interlock mechanism 24 prevents the parking brake handle 25 to be placed in the engaged position.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A riding lawnmower comprising:

a chassis;

a power source;

first and second drive wheels at least partially supporting said chassis and rotatable via the power source to cause movement of said lawnmower;

first and second control levers associated with and controlling first and second drive systems, respectively, to control the direction and speed of rotation of said first and second drive wheels, respectively, each of said control levers having a neutral position in which the associated drive system does not cause rotation of the associated drive wheel, wherein each of said control levers comprises a plate member having a notch in an edge of said plate member;

a park brake system operatively interconnected with at least one of said drive wheels, said park brake system comprising a parking brake handle movable between an engaged position and a disengaged position to cause said park brake system to respectively resist and not resist rotation of said at least one drive wheel; and an interlock mechanism providing an interface between the park brake handle and the control levers, wherein the notch in each plate member is located such that when said control lever is in said neutral position, a portion of said interlock mechanism is received within said notch when the park brake handle is placed in said engaged position such that said interlock mechanism permits said parking brake handle to be placed in said engaged position, and when said control lever is not in said neutral position, said interlock mechanism contacts the edge of the plate member and prevents the park brake handle from being placed in said engaged position.

2. The lawnmower of claim 1 wherein said park brake interlock mechanism comprises first and second interlock arms linked to said park brake handle, said interlock arms having respective portions configured to be received within said notches in said control plates.

3. The lawnmower of claim 2, further comprising a parking brake sensor configured to determine when said parking brake handle is in the engaged position, said sensor interfacing with a starting device for starting said power source, wherein said sensor prevents said starting device from starting said power source when said parking brake handle is not in said engaged position.

4. The lawnmower of claim 3, wherein said sensor does not directly determine whether said control levers are in said neutral positions.

5. The lawnmower of claim 3, wherein said parking brake sensor includes a plunger depressed by a finger on said brake handle in response to movement of said parking brake handle into said engaged position.

6. The lawnmower of claim 1, wherein the parking brake interlock mechanism is mounted to the chassis and further comprises a a brake actuating rod affixed to the parking brake handle, and wherein each of the interlock arms has a post extending therefrom.

7. The lawnmower of claim 6, wherein one end of the brake actuating rod is mounted to the park brake handle and a second end of the brake actuating rod is affixed to a bell-crank linkage comprising two offset links with an extension arm that extends transverse across the mower chassis connecting the two links.

8. The lawnmower of claim 7, wherein the interlock arms are linked to the park brake handle so that movement of the park brake handle causes movement of the interlock arms.

9. The lawnmower of claim 8, wherein the edge of the control plate has the notch formed therein, the notch being located in the control plate so that when the control arm and the control plate are in the neutral position, the notch aligns with the post on the interlock arm.

10. The lawnmower of claim 9, wherein when the parking brake handle is rotated to the engaged position, thereby causing the interlock arms to move in a rearward direction, the post is received in the aligned notch and when the parking brake handle is rotated toward the engaged position while the control lever and control plate are not in the neutral position, the notch does not align with the post on the interlock arm and the post contacts the edge of the plate member, thereby preventing the parking brake handle from being positioned in the engaged position.

11. The lawnmower of claim 10, wherein the control plates have substantially identical notches such that the parking brake system can only be engaged when both of the control levers are in the neutral position.

* * * * *